(12) United States Patent
Fiske et al.

(10) Patent No.: US 10,133,747 B2
(45) Date of Patent: *Nov. 20, 2018

(54) PRESERVING REDUNDANCY IN DATA DEDUPLICATION SYSTEMS BY DESIGNATION OF VIRTUAL DEVICE

(75) Inventors: Rahul M. Fiske, Pune (IN); Carl Evan Jones, Tucson, AZ (US); Subhojit Roy, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 604 days.

This patent is subject to a terminal disclaimer.

(21) Appl. No.: 13/453,270

(22) Filed: Apr. 23, 2012

(65) Prior Publication Data
US 2013/0282671 A1    Oct. 24, 2013

(51) Int. Cl.
*G06F 17/30*    (2006.01)

(52) U.S. Cl.
CPC .............. *G06F 17/30156* (2013.01)

(58) Field of Classification Search
CPC ................................. G06F 17/30156
USPC .................................. 707/664, 692
See application file for complete search history.

(56) References Cited

U.S. PATENT DOCUMENTS

| | | | |
|---|---|---|---|
| 7,567,188 B1 | 7/2009 | Anglin et al. | |
| 7,818,495 B2 | 10/2010 | Tanaka et al. | |
| 7,908,436 B1 | 3/2011 | Srinivasan et al. | |
| 8,074,049 B2 | 12/2011 | Gelson et al. | |
| 8,086,799 B2 | 12/2011 | Mondal et al. | |
| 8,117,464 B1 | 2/2012 | Kogelnik | |
| 8,468,138 B1 | 6/2013 | Chhaunker et al. | |
| 8,527,544 B1 | 9/2013 | Colgrove et al. | |
| 8,539,148 B1 | 9/2013 | Chen et al. | |
| 8,589,640 B2 | 11/2013 | Colgrove et al. | |
| 8,660,994 B2 | 2/2014 | Slater et al. | |
| 8,712,976 B1 | 4/2014 | Chen et al. | |
| 9,058,118 B1 | 6/2015 | Urkude et al. | |
| 2003/0115447 A1 | 6/2003 | Pham et al. | |
| 2003/0225800 A1 | 12/2003 | Kavuri | |
| 2004/0111625 A1 | 6/2004 | Duffy et al. | |
| 2004/0131182 A1 | 7/2004 | Rogaway | |
| 2006/0179489 A1 | 8/2006 | Mas Ribes | |
| 2006/0230076 A1 | 10/2006 | Gounares et al. | |
| 2007/0168350 A1 | 7/2007 | Utiger | |
| 2008/0098083 A1 | 4/2008 | Shergill et al. | |

(Continued)

FOREIGN PATENT DOCUMENTS

| | | |
|---|---|---|
| CN | 1341240 A | 3/2002 |
| CN | 101656720 A | 2/2010 |

(Continued)

OTHER PUBLICATIONS

Gu Yu et al., "Reliability Provision Mechanism for Large-Scale De-duplication Storage Systems" pp. 739-744, vol. 50, No. 5, 2010., J Tsinghua Univ (Sci & Tech), ISSN 1000-0054.

(Continued)

*Primary Examiner* — Grace Park
(74) *Attorney, Agent, or Firm* — Griffiths & Seaton PLLC

(57) ABSTRACT

Various embodiments for preserving data redundancy in a data deduplication system in a computing environment are provided. At least one virtual device out of a volume set is designated as not subject to a deduplication operation.

13 Claims, 5 Drawing Sheets

(56) References Cited

U.S. PATENT DOCUMENTS

| | | |
|---|---|---|
| 2008/0244172 A1 | 10/2008 | Kano |
| 2009/0063795 A1 | 3/2009 | Yueh |
| 2009/0063883 A1 | 3/2009 | Mori |
| 2009/0268903 A1 | 10/2009 | Bojinov et al. |
| 2009/0271402 A1 | 10/2009 | Srinivasan et al. |
| 2009/0319585 A1 | 12/2009 | Gokhale |
| 2009/0319772 A1 | 12/2009 | Singh et al. |
| 2010/0037118 A1 | 2/2010 | Saliba et al. |
| 2010/0070478 A1 | 3/2010 | Anglin |
| 2010/0070715 A1 | 3/2010 | Waltermann et al. |
| 2010/0121825 A1 | 5/2010 | Bates et al. |
| 2010/0250501 A1 | 9/2010 | Mandagere et al. |
| 2010/0250549 A1 | 9/2010 | Muller |
| 2010/0268960 A1 | 10/2010 | Moffat et al. |
| 2010/0299311 A1 | 11/2010 | Anglin et al. |
| 2010/0306412 A1 | 12/2010 | Therrien et al. |
| 2010/0313036 A1 | 12/2010 | Lomb |
| 2010/0313040 A1 | 12/2010 | Lumb |
| 2010/0333116 A1 | 12/2010 | Prahlad et al. |
| 2011/0022718 A1 | 1/2011 | Evans et al. |
| 2011/0029739 A1 | 2/2011 | Nakajima et al. |
| 2011/0035541 A1 | 2/2011 | Tanaka et al. |
| 2011/0066628 A1 | 3/2011 | Jayaraman |
| 2011/0145207 A1 | 6/2011 | Agrawal et al. |
| 2011/0145576 A1 | 6/2011 | Bettan |
| 2011/0225130 A1 | 9/2011 | Tokoro |
| 2011/0225214 A1 | 9/2011 | Guo |
| 2011/0238634 A1 | 9/2011 | Kobara |
| 2011/0238635 A1 | 9/2011 | Leppard |
| 2011/0239097 A1 | 9/2011 | Bates et al. |
| 2011/0258398 A1 | 10/2011 | Saliba et al. |
| 2012/0017043 A1 | 1/2012 | Aizman et al. |
| 2012/0072654 A1 | 3/2012 | Olbrich et al. |
| 2012/0089574 A1 | 4/2012 | Doerner |
| 2012/0095968 A1 | 4/2012 | Gold |
| 2012/0158672 A1* | 6/2012 | Oltean et al. ............... 707/692 |
| 2012/0317084 A1 | 12/2012 | Liu |
| 2013/0086006 A1 | 4/2013 | Colgrove et al. |
| 2013/0097380 A1 | 4/2013 | Colgrove et al. |
| 2013/0144846 A1 | 6/2013 | Chhaunker et al. |
| 2013/0198742 A1 | 8/2013 | Kumar et al. |
| 2013/0262404 A1 | 10/2013 | Daga et al. |
| 2013/0262753 A1 | 10/2013 | Prins et al. |

FOREIGN PATENT DOCUMENTS

| | | |
|---|---|---|
| CN | 201110156839 A | 6/2011 |
| CN | 102156727 A | 8/2011 |
| CN | 102221982 A | 10/2011 |
| CN | 102281320 A | 12/2011 |
| JP | 2006308636 A | 11/2006 |
| WO | 2011033582 A1 | 3/2011 |

OTHER PUBLICATIONS

Wang et al, "Research on Secure De-duplication based on Proxy-Recreation", Dec. 27, 2011, pp. 1-6, Sciencepaper Online.

* cited by examiner

US 10,133,747 B2

PRESERVING REDUNDANCY IN DATA DEDUPLICATION SYSTEMS BY DESIGNATION OF VIRTUAL DEVICE

BACKGROUND OF THE INVENTION

Field of the Invention

The present invention relates in general to computers, and more particularly to a system and computer program product for preserving redundancy and other data security characteristics in computing environments in which data deduplication systems are incorporated.

Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

SUMMARY OF THE INVENTION

Many multi-tiered/multi-system computing environments implement data deduplication technologies to improve storage performance by reducing the amount of duplicated storage across storage devices. Data deduplication systems are increasingly utilized because they help reduce the total amount of physical storage that is required to store data. This reduction is accomplished by ensuring that duplicate data is not stored multiple times. Instead, for example, if a chunk of data matches with an already stored chunk of data, a pointer to the original data is stored in the virtual storage map instead of allocating new physical storage space for the new chunk of data.

In certain situations, however, the behavior of deduplication may go against the redundancy requirements of a hosted application, for example, or a storage policy, or other requirements. A need exists for a mechanism whereby identical data having redundancy requirements is safeguarded, yet the benefits of deduplication systems are not diminished, by allowing deduplication to occur for remaining data not having such requirements.

In view of the foregoing, various embodiments for preserving data redundancy in a data deduplication systems are disclosed. In one embodiment, by way of example only, a method for such preservation is disclosed. For a multi-device file system, at least one virtual device out of a volume set is designated as not subject to a deduplication operation.

In addition to the foregoing exemplary embodiment, various system and computer program embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
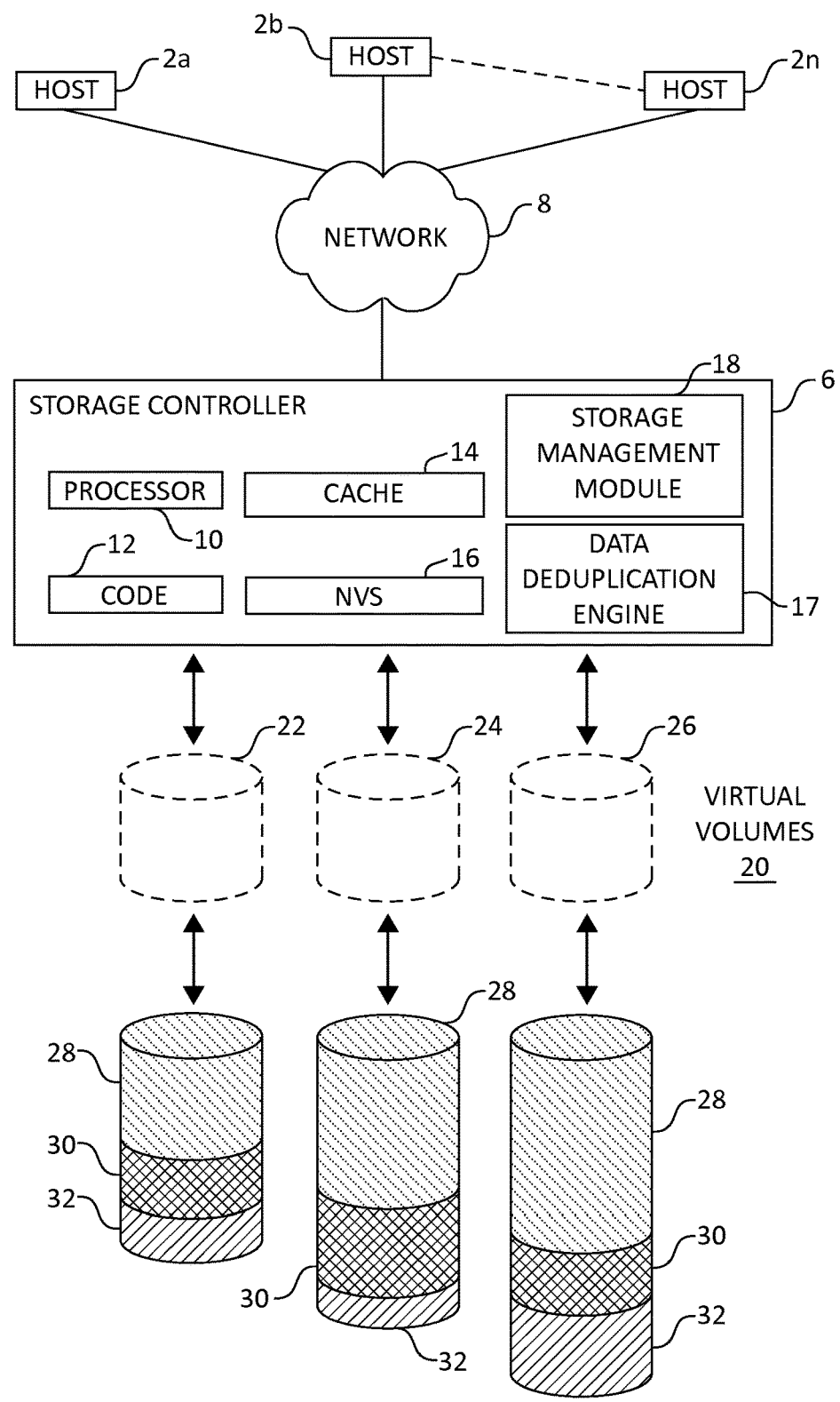
FIG. 1 is a block diagram illustrating an exemplary computing environment which may implement aspects of the present invention.

Data deduplication in storage controllers typically works "behind the scene" of an application, and may sometimes operate contrary to the interests of the application when deduplication operations are performed against the needs of the application. This situation may arise if an application writes multiple copies of the same data, and intends to retain multiple physical copies, while the deduplication subsystem (deduplication engine) finds these matching copies and ends up deduplicating the copies while storing the data. This can be detrimental to the application, which expects to find multiple copies at various locations, and is made to believe that it has done so by the storage subsystem, but in reality only a single copy of the data has been written.

Consider the following example. File systems usually prefer to write multiple physical copies of the "Superblock," or a segment of metadata describing the file system on a block-based storage device, (or other metadata information) on a virtual disk to ensure redundancy. Since the contents of the Superblock are the same, data deduplication would result in retaining a single, physical copy of the Superblock and point multiple virtual addresses to the same physical block. This situation is highly inadvisable, because the loss of a single block on the physical copy of the Superblock may render the file system totally unusable, as there are no redundant copies of the Superblock. Conventionally, there are no existing methodologies that directly address this problem in data deduplication systems.

Various indirect methodologies may be employed to attempt to address this problem. In one example, the storage pool from which the data deduplication subsystem carves out physical storage can be mirrored (i.e., contains 2 or 3 copies of the same data). Hence multiple redundant copies can be created despite deduplication. However, this is inadequate protection for the application because of the following reasons. First, the application may wish to keep, for example, ten (10) copies of the same data. However, if the storage pool is two-way mirrored, it may only retain a maximum of two (2) copies. Second, since data deduplication carves out physical storage pools that span across large amounts of storage and multiple file systems, it is likely that multiple applications and file systems share the same physical storage pool. Hence it is possible that some critical copies of data (like the Superblock) from multiple file-systems are physically placed on the same disk. Since deduplication would prevent multiple copies of the same data to be written to multiple physical locations, the number of copies of critical data reduces and they can be placed on the same physical disk for multiple file systems. This increases the risk of single failures becoming fatal.

The illustrated embodiments provide multiple mechanisms for addressing the issues discussed previously. One goal of these mechanisms is to ensure that the deduplication subsystem in the storage controller (or wherever it may be located) balances the benefits of reducing the number of copies of data against application requirements for physical allocating multiple copies of identical data that is critical. Each of the methodologies described in the following illustrated embodiments may be used in a variety of circumstances and may have attendant benefits specific to those circumstances.

In one such embodiment, for multi-device file systems, one or more of the virtual disks associated in such file systems may be designated such that the virtual disks become devices in which storage components (such as the storage controller) does not perform deduplication operations for, such as deduplicating incoming write commands for these devices. The owning application may thereby allocate space to these specific virtual disks in order to store multiple physical copies of identical data.

In view of the described embodiment, by allowing the application to allocate certain data to un-deduplicated storage, and thereby dictate whether a write must be deduplicated, the application is allowed flexibility to implement storage policy associated with the data it generates. This way, the application is in a better position than the deduplication system to determine whether selected data blocks, even though identical, must still be located in separate physical locations. In addition, the storage controller (or other storage management device) continues to perform its role of data reduction by deduplication, and at the same time allows enough control to the owning application to rule out deduplication when required.

By allowing an owning application control to, in effect, designate which data is to forgo data deduplication operations by specifically allocating it as such, very fine-grained control is thereby provided to the application, allowing for flexibility in implementation while still retaining advantages of deduplication functionality and retaining redundancy for key data.

In the following description, reference is made to the accompanying drawings which form a part hereof and which illustrate several embodiments of the present invention. It is understood that other embodiments may be utilized and structural and operational changes may be made without departing from the scope of the present invention.

FIG. 1 illustrates a computing storage environment in which aspects of the invention may be implemented. A plurality of host systems 2a, b . . . n transmit Input/Output (I/O) requests to one or more storage volumes 28, 30, and 32 through a storage controller 6 which manages access to the storage volumes 28, 30, and 32. In certain implementations, the storage volumes may be physically comprised of a plurality of hard disk drives organized as Just a Bunch of disks (JBOD), a RAID array, Direct Access Storage Devices (DASD), SSD, tape devices, etc.

A number of virtual volumes 22, 24, and 26 are presented to the host systems 2a, b . . . n in lieu of presenting a number of physical or logical volumes (often which may be physically configured in a complex relationship). The host systems 2a, b . . . n may communicate with the storage controller 6 over a network 8, such as the Internet, a Storage Area Network (SAN), an Intranet, Local Area Network (LAN), Wide Area Network (WAN), etc., using multiple communication protocols such as TCP/IP, Fibre Channel, Ethernet, etc. at different layers in a protocol stack.

The storage controller 6 includes a processor 10 executing code 12 to perform storage controller operations. The storage controller 6 further includes a cache system 14 and non-volatile storage unit 16, such as a battery backed-up memory device. The storage controller 6 stores in cache 14 data updates received from the hosts 2a, b . . . n to write to the virtual storage volumes 22, 24, and 26 (and thereby to volumes 28, 30, and 32) as well as data read from the volumes 28, 30, and 32 to return to the hosts 2a, b . . . n. When operating in Fast Write mode, data updates received from the hosts 2a, b . . . n are copied to both cache 14 and the NVS 16. End status is returned to the host 2a, b . . . n sending the data update after the update is copied to both the cache 14 and NVS 16.

Storage controller 6 also includes a data deduplication engine 17 in communication with a storage management module 18 as will be further described. Data deduplication engine 17 is configured for performing, in conjunction with processor 10, data deduplication operations on write data passed through storage controller 6 to virtual volumes 20 and volumes 28, 30, and 32.

Cache system 14 may include a data frequency index map, or "storage map" for short, which is not shown for purposes of illustrative convenience. In one embodiment, cache system 14 accepts write data from hosts 2a, b . . . n or similar devices, that is then placed in cache memory. Data deduplication engine 17 then tests the write data for duplication in the cache memory and writes an index and frequency for such in the storage map.

FIG. 1, as one of ordinary skill in the art will appreciate, may illustrate a portion of a larger, multi-system/multi-cluster storage environment having a number of interrelated components such as the previously illustrated storage controller 6. As previously indicated, while virtual volumes 22, 24, and 26 are presented to the user via the host systems 2a, b . . . n, the underlying physical configuration may take many possible forms. For example, a number of interrelated storage devices in various classes, such as SSD, SATA, HDD, tape, etc. may comprise the storage volumes 28, 30, and 32 depending on a particular configuration.

Figure 2:
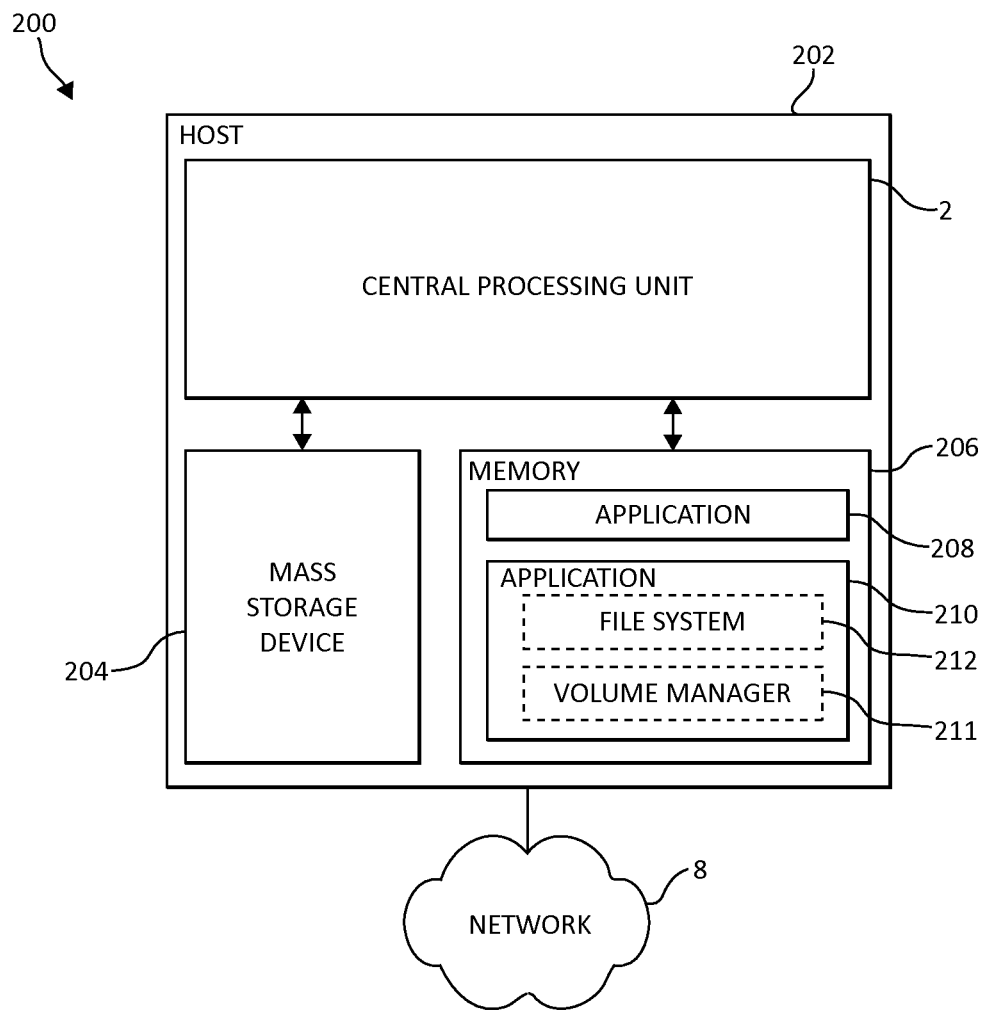
FIG. 2 is a block diagram of an exemplary application and file system, operational in the data storage environment depicted previously in FIG. 1, in which aspects of the present invention may be implemented.

Turning to FIG. 2, an example host computer system 200 is depicted in which aspects of the present invention may be realized. Host computer system 200 includes host 2 as previously depicted in FIG. 1, having central processing unit (CPU) 202, which is connected to mass storage device(s) 204 and memory device 206. Mass storage device 204 may include hard disk drive (HDD) devices, which may be configured in a redundant array of independent disks (RAID).

The storage management operations further described may be executed on memory 206, located in system 200 or elsewhere. Memory device 206 may include such memory as electrically erasable programmable read only memory (EEPROM) or a host of related devices. Memory device 206 and mass storage device 204 are connected to CPU 202 via a signal-bearing medium. In addition, CPU 202 and overall host 2 are connected to communication network 8.

Memory 206 as shown includes an application 208, and an application 210, in which a file system 212 is operational. Application 208 and Application 210 may create, delete, or otherwise manage segments of data, such as data chunks or data blocks, which are physically stored in devices such as mass storage device 204, for example, in storage 28, 30, and 32 as shown in FIG. 1 in a tiered storage arrangement. File system 212 provides a means to organize data expected to be retained after the application program 210 terminates by providing procedures to store, retrieve, and update data, as well as manage the available space on the device(s) that contain it. The file system 212 organizes data in an efficient manner, and is tuned to the specific characteristics of the device (such as computer host 2, CPU 202 and/or memory 206).

A "volume manager" 211 such as a Logical Volume Manager (LVM) operational in Linux® architectures may constitute at least a portion of an application 210. The LVM manages disk drives and similar mass-storage devices (e.g., storage volumes 28, 30, and 32, FIG. 1). Volume manager 211 may also include proprietary volume managers such as Veritas® Volume Manager (VxVM), which also performs storage management visualization functionality as one of ordinary skill in the art will appreciate. Volume manager 211 can enable multi-device file system functionality, including providing volume sets which may be designated as deduplication free according to aspects of the present invention.

In one embodiment, application 208 may be an operating system (OS) 208, or application 210 may be an OS 210, and file system 212 retains a tight coupling between the OS 210 and the file system 212. File system 212 may provide mechanisms to control access to the data and metadata, and may contain mechanisms to ensure data reliability such as those necessary to further certain aspects of the present invention, as one of ordinary skill in the art will appreciate. File system 212 may provide a means for multiple application programs 208, 210 to update data in the same file at nearly the same time.

As previously described, the storage controller 6 (again, FIG. 1) may have an ability to classify portions of virtual volumes (devices) 20, or entire volumes of virtual volumes 20 as free from data deduplication processing. Applications 208, 210, and file system 212 operate in conjunction with the storage controller 6 to allocate this classified storage to selected data segments as will be further described.

In one exemplary embodiment, the computing administrator may create Logical Unit Names (LUNs) (virtual devices) on the storage controller 6 (again, FIG. 1) that must not participate in data deduplication. In multi-device file system architectures contemplated by the mechanisms of the illustrated embodiments, the file system may use a set of underlying virtual disks to create a file system. A specific file system may be tailored to allocate different types of data on different devices, for example. This multi-device configuration, which includes at least one device that does not participate in data deduplication, is then presented to an owning application (e.g., applications 208, 210). The owning application then uses this device to allocate space for those portions of metadata/data it considers critical enough to bypass data deduplication.

While discovering the above virtual device 20 that is created by the storage controller 6, the respective device or devices not subject to deduplication may be conveyed to the owning application by means of a special Small Computing System Interface (SCSI) command, for example. In one embodiment, this command may be a Mode Sense command or a unique page of the Inquiry command. This information may be conveyed to the application in an out-of-band fashion as well.

Once the application 208, 210 or file system 212 comes to know the virtual device(s) described previously, the application 208, 210 or file system 212 may allocate space from these devices for those data segments where deduplication is not desired (e.g., the Superblock). This way, multiple copies of identical data blocks may be stored by the owning application when the owning application issues write commands to these specially designated virtual devices.

Figure 3:
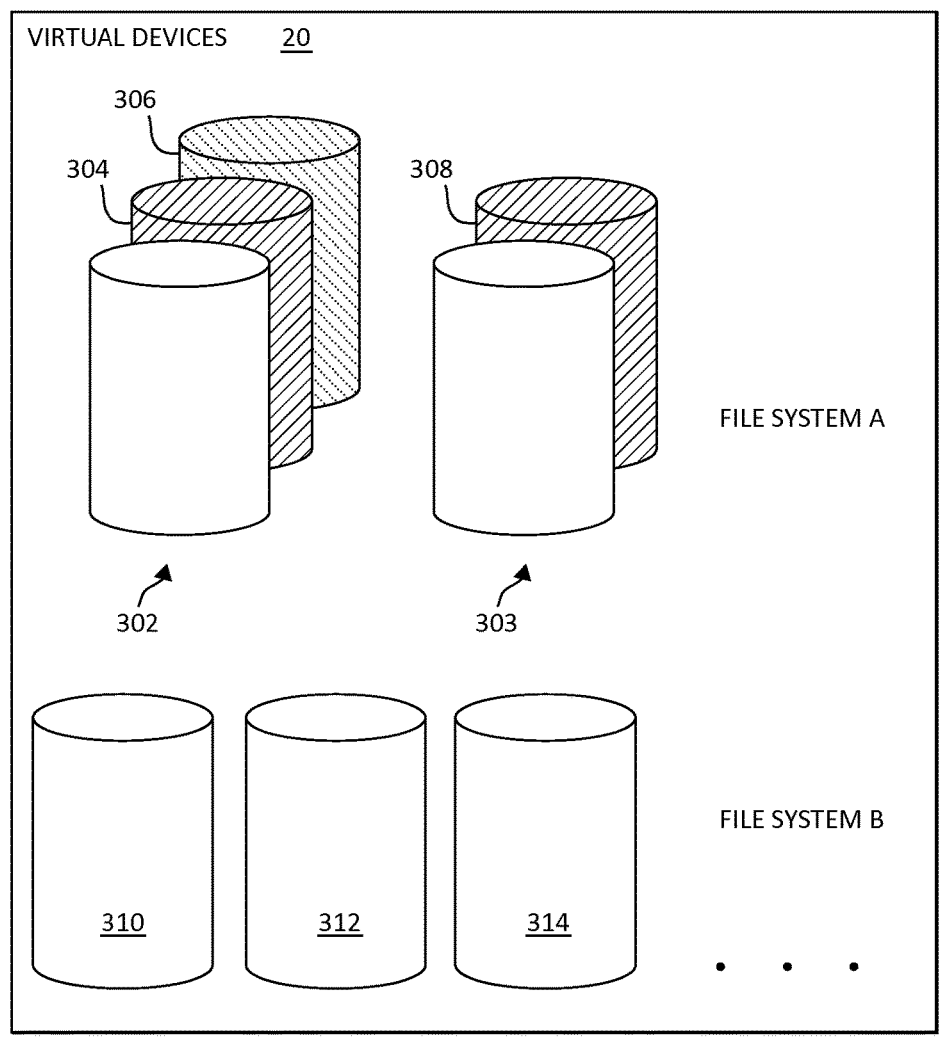
FIG. 3 is a block diagram of virtual devices operational in file systems, in which aspects of the present invention may be implemented.

Turning now to FIG. 3, a block diagram of a several volume sets 300 is illustrated. Volume set 20 includes multiple underlying storage volumes that are grouped together such that multi-device file systems can utilize such group volumes as a set. Volume sets 300 include virtual devices 20 as shown. The virtual devices may include volumes 304 and 306 which are grouped in set 302, and volume 308 as part of grouped set 303 as shown, and associated with File System A, and volumes 310, 312, and 314, etc, as associated with File System B. Here, volumes 304 and 306 in set 302 are designated as "no dedup" (i.e., free from deduplication operations). Similarly, in volume set 303, volume 308 is designated to be free from deduplication operations. The owning application may continue to allocate non-deduplication-subject data to volumes 304 and 306, or volume 308 as shown, so long as room exists in the virtual volume for the data to be allocated/written.

As one of ordinary skill in the art will appreciate, if the allocated volume (e.g., volume 308) is full, the owning application/multi-device file system/storage controller/volume manager may choose to allocate the non-deduplication-subject data to another volume, such as volume 304 or volume 306, or may create/designate another volume (e.g., volume 310) in another volume set as subject to no deduplication. As one of ordinary skill in the art will appreciate, these processes may vary according to a particular implementation, characteristics of the underlying physical storage, resource considerations (e.g., bandwidth and cost considerations) and the like.

Figure 4:
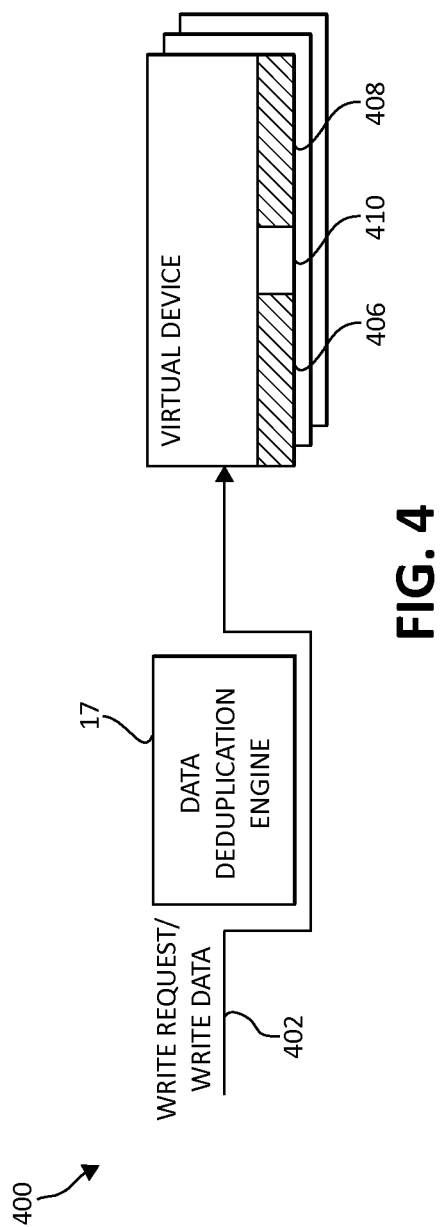
FIG. 4 is a block diagram of an exemplary process of writing data through a data deduplication engine, again in which aspects of the present invention may be implemented.

FIG. 4, following, illustrates various functionality 400 associated with aspects of the present invention as illustrated in an exemplary flow. In FIG. 4, the multi-device file system has now issued a write command to physically write the selected data (write request/write data 402) to bypass the deduplication system (data deduplication engine 17) to the specially allocated virtual volume(s) in the volume sets as previously described. The write request 404 and accompanying write data 402 bypass the deduplication engine without any deduplication operations performed thereon (such as data fingerprint functionality), and the selected data is written to the virtual volume as segments 406, and 408 (and ultimately written to physical disk). Virtual volume segments 406 and 408 are not contiguous as shown (they are separated by segment 410). In another embodiment, file system, application, volume manager, or other virtualization device may determine whether to write the selected data to the allocated storage in a contiguous or non-contiguous segment.

Figure 5:
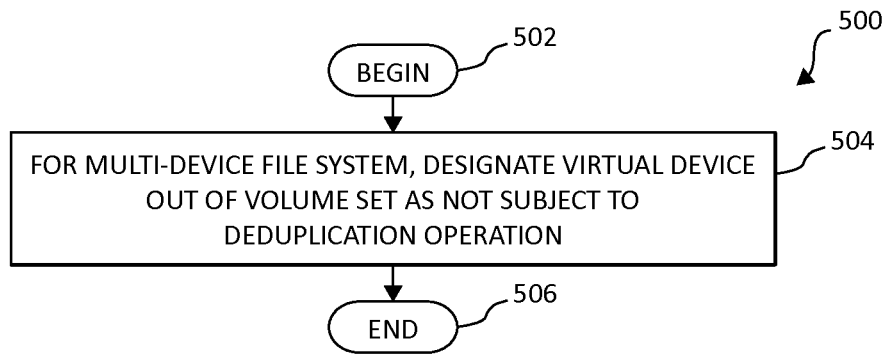
FIG. 5 is an exemplary method for ensuring redundancy in data deduplication systems according to the present invention.

FIG. 5, following, is a flow chart diagram of an exemplary method 500 for ensuring data redundancy in storage subsystems having data deduplication systems, in which aspects of the present invention may be implemented. Method 500 begins (step 502) by designating a virtual device out of a volume set as not subject to a deduplication operation. The method 500 then ends (step 506).

Figure 6:
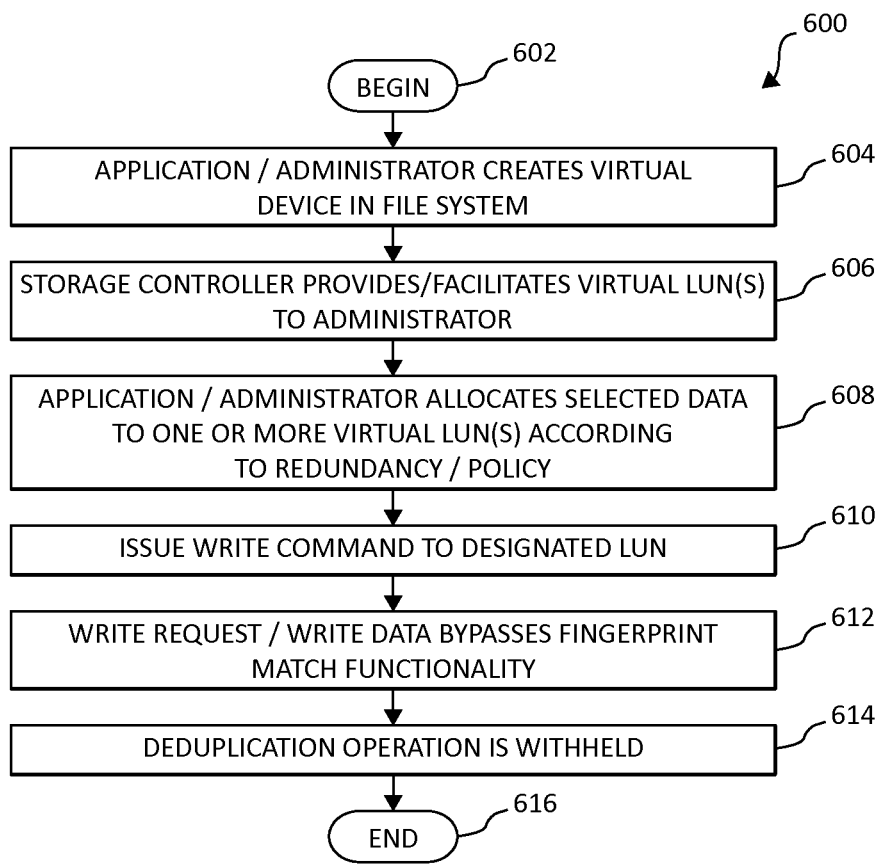
FIG. 6 is an exemplary method for processing data in which aspects of the present invention may be implemented.

FIG. 6, following, is an additional flow chart diagram of an exemplary method 600 for data processing, here again in which aspects of the present invention may be implemented. Method 600 begins (step 602) by an owning application/storage virtualization device (host or storage controller)/administrator creating virtual device(s)/volume(s) to forgo data deduplication processing (step 604). As a following step, the storage controller provides and otherwise facilitates communication of the designated virtual LUNs to the administrator/owning application/storage virtualization device (step 606). The owning application/administrator/virtualization device then allocates selected data (e.g., Superblock data) to one or more virtual LUNs according to need (such as importance of the data, desired redundancy, or a storage policy).

In a following step, a write command is then issued to the designated LUN (step 610). The write data bypasses the deduplication system to the allocated storage in the LUNs/virtual volume(s) (step 612), and deduplication operations are withheld from being performed (step 614). The method 600 then ends (step 616).

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "process" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, or entirely on the remote computer or server. In the last scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A system for preserving data redundancy in a data deduplication system in a computing environment, comprising:
   a storage virtualization device; and
   a multi-device file system module, in conjunction with a processor, in operable communication with the storage virtualization device, wherein each of a selected data type is associated with and stored on each respective device of the multi-device file system, and wherein the multi-device file system module:
      designates at least one virtual device out of a volume set as not subject to a deduplication operation by allowing a data set to be written to a designated virtual address to bypass the data deduplication system, such that the deduplication operation is withheld from being performed on the data to be written; and
      uses an application operable on a given host in the computing environment, the application issuing write commands for, and thereby owning the data to be written comprising file system superblock data, to control which of the data to be written to the designated virtual address will bypass the data deduplication system based upon one of a defined importance of the data to be written, a desired redundancy, and a storage policy associated with the application; wherein the owning application allocates space in the at least one virtual device for those portions of the data to be written to the designated virtual address which will bypass the data deduplication system using knowledge of which respective data type is associated and stored on which respective device to facilitate determining the designated virtual address to write those portions of the data to be written to bypass deduplication, thereby providing to the application flexibility in administrating which of the owned data of the application is stored redundantly while preserving data reduction techniques in the computing environment via the data deduplication.

2. The system of claim 1, wherein the storage virtualization device includes at least one of a storage controller, the owning application, and a volume manager.

3. The system of claim 1, wherein the multi-device file system module is further configured for creating the designated at least one virtual device in the multi-device file system.

4. The system of claim 3, wherein the multi device file-system module is further configured for, pursuant to creating the designated at least one virtual device, allocating selected data to the designated at least one virtual device.

5. The system of claim 4, wherein the multi-device file system module is further configured for, pursuant to allocating the selected data, allocating the selected data based on a predetermined level of desired redundancy.

6. The system of claim 4, wherein the multi-device file system module is further configured for, pursuant to allocating the selected data, allocating the selected data according to a predetermined policy.

7. The system of claim 1, further including an application in operable communication with the multi-device file system module, wherein the application is configured for providing a plurality of available virtual devices, including the designated at least one virtual device not subject to the deduplication operation, to a user.

8. A computer program product for preserving data redundancy in a data deduplication system in a computing environment by a processor, the computer program product comprising a non-transitory computer-readable storage medium having computer-readable program code portions stored therein, the computer-readable program code portions comprising:
   a first executable portion that:
      for a multi-device file system wherein each of a selected data type is associated with and stored on each respective device of the multi-device file system, designates at least one virtual device out of a volume set as not subject to a deduplication operation by allowing a data set to be written to a designated virtual address to bypass the data deduplication system, such that the deduplication operation is withheld from being performed on the data to be written; and
      uses an application operable on a given host in the computing environment, the application issuing write commands for, and thereby owning the data to be written comprising file system superblock data, to control which of the data to be written to the designated virtual address will bypass the data deduplication system based upon one of a defined importance of the data to be written, a desired redundancy, and a storage policy associated with the application; wherein the owning application allocates space in the at least one virtual device for those portions of the data to be written to the designated virtual address which will bypass the data deduplication system using knowledge of which respective data type is associated and stored on which respective device to facilitate determining the designated virtual address to write those portions of the data to be written to bypass deduplication, thereby providing to the application flexibility in administrating which of the owned data of the application is stored redundantly while preserving data reduction techniques in the computing environment via the data deduplication.

9. The computer program product of claim 8, further including a second executable portion for creating the designated at least one virtual device in the multi-device file system.

10. The computer program product of claim 9, further including a third executable portion for, pursuant to creating the designated at least one virtual device, allocating selected data to the designated at least one virtual device.

11. The computer program product of claim 10, further including a fourth executable portion for, pursuant to allocating the selected data, allocating the selected data based on a predetermined level of desired redundancy.

12. The computer program product of claim 11, further including a fifth executable portion for, pursuant to allocating the selected data, allocating the selected data according to a predetermined policy.

13. The computer program product of claim 8, further including a second executable portion for providing, by an application operable in the computing environment, a plurality of available virtual devices, including the designated at least one virtual device not subject to the deduplication operation, to a user.

* * * * *